United States Patent
Campbell et al.

(10) Patent No.: US 9,212,958 B2
(45) Date of Patent: Dec. 15, 2015

(54) NON-CONTACT MAGNETOSTRICTIVE SENSING SYSTEMS AND METHODS

(71) Applicant: General Electric Company, Schenectady, NY (US)

(72) Inventors: Lam Arthur Campbell, Houston, TX (US); Pekka Tapani Sipilä, Munich (DE)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 13/729,468

(22) Filed: Dec. 28, 2012

(65) Prior Publication Data

US 2014/0184210 A1    Jul. 3, 2014

(51) Int. Cl.
*G01L 1/12*    (2006.01)
*G01L 3/10*    (2006.01)

(52) U.S. Cl.
CPC .................. *G01L 1/125* (2013.01); *G01L 1/122* (2013.01); *G01L 1/127* (2013.01); *G01L 3/102* (2013.01); *G01L 3/105* (2013.01)

(58) Field of Classification Search
CPC .......... G01L 1/122; G01L 1/127; G01L 1/125
USPC ........................................................ 324/209
See application file for complete search history.

(56) References Cited

U.S. PATENT DOCUMENTS

| | | | |
|---|---|---|---|
| 2,365,073 A * | 12/1944 | Haight | 73/862.28 |
| 4,566,338 A | 1/1986 | Fleming et al. | |
| 4,716,773 A * | 1/1988 | Nonomura et al. | 73/862.333 |
| 5,144,846 A | 9/1992 | Klauber et al. | |
| 5,201,964 A | 4/1993 | Savage et al. | |
| 5,542,304 A | 8/1996 | Sasada et al. | |
| 6,494,102 B2 | 12/2002 | Hanisko | |
| 6,779,409 B1 | 8/2004 | Kwun et al. | |
| 6,972,560 B2 | 12/2005 | Baudendistel et al. | |
| 7,478,568 B2 | 1/2009 | Yoneda et al. | |
| 8,020,455 B2 | 9/2011 | Sihler et al. | |
| 2001/0045135 A1 | 11/2001 | Horiuchi et al. | |
| 2007/0089287 A1 | 4/2007 | Harata et al. | |
| 2008/0168844 A1 | 7/2008 | Lequesne et al. | |
| 2009/0025488 A1 | 1/2009 | Sihler et al. | |
| 2009/0145239 A1 | 6/2009 | Girshovich et al. | |
| 2009/0230953 A1 | 9/2009 | Lee | |

(Continued)

FOREIGN PATENT DOCUMENTS

| | | |
|---|---|---|
| EP | 0352187 A1 | 1/1990 |
| GB | 238417 A | 8/1925 |
| WO | 2012152720 A | 11/2012 |

OTHER PUBLICATIONS

PCT Search Report and Opinion issued in connection with corresponding Application No. PCT/US2013/072802 on Aug. 12, 2014.

*Primary Examiner* — Thomas F Valone
(74) *Attorney, Agent, or Firm* — Fletcher Yoder, P.C.

(57) ABSTRACT

A system for sensing stress in a ferromagnetic material is provided. The system includes at least one magnetic flux device configured to induce a conditioning magnetic flux in the ferromagnetic material. The system also includes a sensor positioned proximate to the ferromagnetic material. The sensor includes a core, at least one excitation coil configured to induce a second magnetic flux in the ferromagnetic material, and at least one detector configured to detect changes in the second magnetic flux.

17 Claims, 6 Drawing Sheets

(56) References Cited

U.S. PATENT DOCUMENTS

| | | |
|---|---|---|
| 2010/0127698 A1 | 5/2010 | Shimada et al. |
| 2010/0236339 A1 | 9/2010 | Buttle et al. |
| 2012/0025528 A1 | 2/2012 | Sipilä et al. |

\* cited by examiner

NON-CONTACT MAGNETOSTRICTIVE SENSING SYSTEMS AND METHODS

BACKGROUND OF THE INVENTION

The subject matter described herein relates generally to stress sensing in ferromagnetic materials, and more particularly, to non-contact systems and methods for the sensing of stress in ferromagnetic materials.

Ferromagnetic materials have a magnetostrictive property that causes the materials to change shape in the presence of an applied magnetic field. The inverse is also true. When a force is applied to a ferromagnetic material, the magnetic properties, such as magnetic permeability, of the material change. A magnetostrictive sensor may sense the changes in magnetic permeability and, because the changes are proportional to the amount of stress applied to the ferromagnetic material, the resulting measurement may be used to calculate the amount of stress.

The changes in the magnetic permeability due to stress applied to the ferromagnetic material, however, may be small, making accurate measurement difficult. At least some known magnetostrictive sensors are used with a ferromagnetic material that has had a magnetic field permanently induced in at least a portion of the material to facilitate measuring the stress in the material. This step may require magnetically encoding the material to be sensed. Such an operation is typically expensive. In addition, such an operation makes it more difficult to retrofit existing systems with a magnetostrictive sensing system because the material to be sensed may have to be removed from the system to undergo permanent magnetic encoding, e.g., a shaft of a gas turbine engine. In at least some other magnetostrictive sensing systems, a temporary magnetic field is induced in a ferromagnetic material, and a magnetic field detector senses transient changes to the magnetic field. In such a system, steady state stress measurements may not be accurately measured or may be necessarily difficult to acquire.

BRIEF DESCRIPTION OF THE INVENTION

In one aspect, a system for sensing stress in a ferromagnetic material is provided. The system includes at least one magnetic flux device configured to induce a first magnetic flux in the ferromagnetic material. The system also includes a sensor positioned proximate to the ferromagnetic material. The sensor includes a core, at least one excitation coil configured to induce a second magnetic flux in the ferromagnetic material, and at least one detector configured to detect changes in the second magnetic flux. The detector is further configured to transmit signals that are indicative of the changes in the second magnetic flux.

In another aspect, a method for measuring stress in a ferromagnetic material is provided. The method includes inducing a first magnetic flux in the ferromagnetic material. The method also includes inducing a second magnetic flux in the ferromagnetic material. Furthermore, the method includes detecting changes in the second magnetic flux induced in the ferromagnetic material. The changes in the second magnetic flux are at least partially a result of stress applied to the ferromagnetic material.

In another aspect, a system for sensing torque in a rotating shaft is provided. The system includes at least one magnetic flux device configured to induce a first magnetic flux in the rotating shaft. In addition, the system includes a sensor that is coupled a predetermined distance from the rotating shaft. The sensor contains a core, and at least one detector configured to detect changes in a second magnetic flux that is induced in the rotating shaft. The detector is further configured to transmit signals indicative of the changes in the second magnetic flux. An amount of torque in the rotating shaft may be determined based on the signals transmitted from the detector.

DETAILED DESCRIPTION OF THE INVENTION

Figure 1:
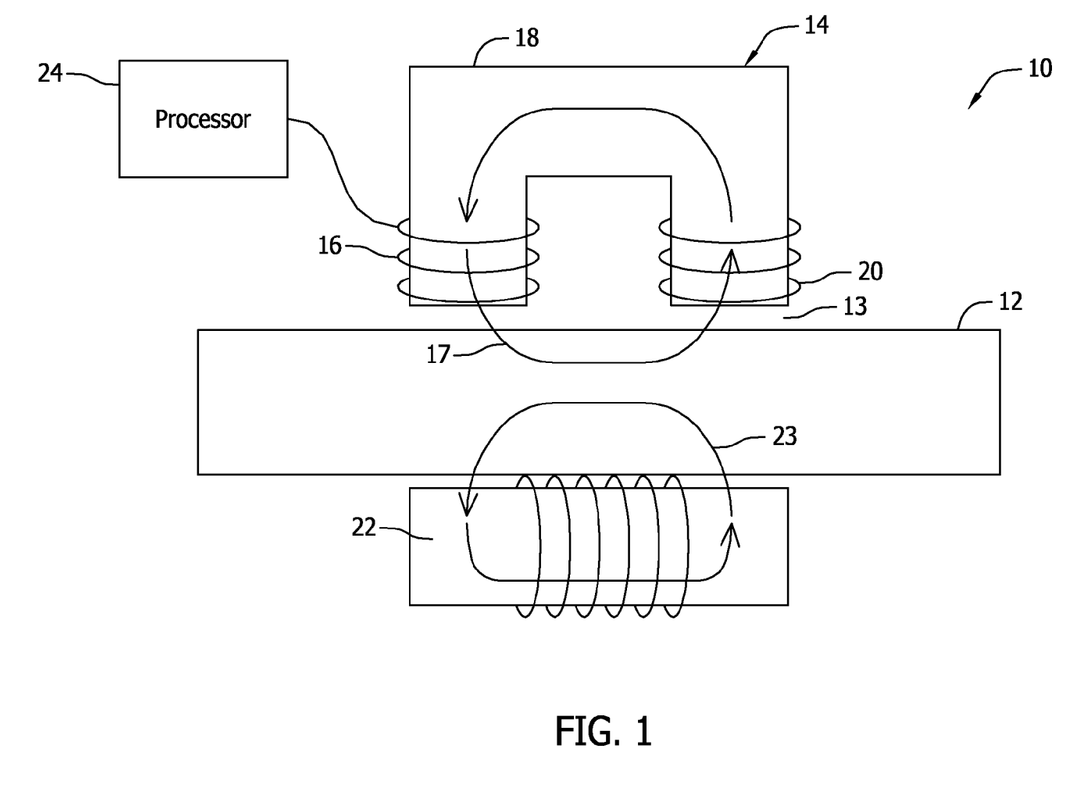
FIG. 1 is a schematic view of a system for sensing stress in a ferromagnetic material.

FIG. 1 is a schematic view of a stress sensing system 10 for sensing the stress in a ferromagnetic material 12. Stress sensing system 10 includes a magnetic flux device 22 for inducing a first conditioning magnetic flux 23 in ferromagnetic material 12. Conditioning magnetic flux 23 induced in ferromagnetic material 12 facilitates increasing the signal-to-noise ratio (SNR) of the magnetic signal to be detected and signal linearity, and reduces the hysteresis associated with stress sensing system 10. By increasing the SNR, magnetic flux device 22 facilitates measuring stresses in ferromagnetic material 12 with less total current being required to operate stress sensing system 10. The lower current requirement permits stress sensing system 10 to be operated in hazardous environments where prior magnetostrictive sensors could not be used.

As used herein, the term "hysteresis" refers to the irreversibility in magnetic permeability of a ferromagnetic material with respect to the applied stress inducing it. In addition, the term "hysteresis loop" refers to a closed curve representing the variation of the magnetic permeability of a ferromagnetic material with respect to the applied stress as the applied stress is changed through a complete cycle.

In the exemplary embodiment, magnetic flux device 22 is a coil located proximate a sensor head 14 and ferromagnetic material 12. Magnetic flux device 22 is driven by either a direct current (DC) source or an alternating current (AC) source (neither shown in FIG. 1), the choice of which is in part dependent on the geometry of ferromagnetic material 12. Alternatively, magnetic flux device 22 may be any magnetic field inducing device that enables stress sensing system 10 to operate as described herein, for example, without limitation, magnetic flux device 22 may be a permanent magnet.

Stress sensing system 10 includes a sensor head 14 positioned proximate to ferromagnetic material 12 with a gap 13 defined between sensor head 14 and ferromagnetic material 12. Sensor head 14 is typically coupled to a frame or fixture (not shown) to maintain the sensor head 14 in the proper orientation. In addition, generally, sensor head 14 includes electrical coupling to a power supply device (not shown in FIG. 1) for supplying the current necessary to generate the magnetic flux used for sensing the stress in ferromagnetic material 12.

In the exemplary embodiment, sensor head 14 includes an excitation coil 16 that is wrapped around a core 18. Core 18 may be fabricated from any ferromagnetic material. Excitation coil 16 has an AC signal is passed through it to induce a second magnetic flux 17 in ferromagnetic material 12. Driving excitation coil 16 with an AC signal to induce second magnetic flux 17 facilitates measuring both transient and steady state stress in ferromagnetic material 12.

In addition, in the exemplary embodiment, second magnetic flux 17 permeates ferromagnetic material 12 and returns to excitation coil 16 such that a detector 20 measures second magnetic flux 17. The permeability for regions of ferromagnetic material 12 change because of stresses applied to the material. Detector 20 is configured to transmit a signal (not shown) indicative of these changes, e.g., detector 20 transmits a signal indicative of the changes in second magnetic flux 17 to a processor 24. Detector 20 may be based on several types of magnetic field sensors (magnetometers) including, without limitation, magnetoresistive, flux gate, coil, Hall Effect, and magnetoinductive sensors. Selection of a specific magnetic field sensor depends upon certain characteristics, such as, without limitation, flux density, resolution, accuracy, and number of magnetic axes.

Processor 24 processes the signal received from detector 20 by using standard electronics, e.g., without limitation, an amplifier and a filter. The signal from detector 20 may be communicated by wire or wireless methods. Wireless communication devices such as radio transmitters (not shown) may be integrated within stress sensing system 10 and mounted about sensor head 14 to transmit the signals to a receiver (not shown) of processor 24. Processor 24 is any known processor, such as, without limitation, a microprocessor or other computing device. Processor 24 may be co-located with sensor head 14 or located separate from sensor head 14.

Alternatively, stress sensing system 10 may be fabricated as a packaged unit with sensor head 14 and magnetic flux device 22 being formed unitarily. In one such embodiment, magnetic flux device 22 includes excitation coil 16. In another such embodiment, where detector 20 is a coil, magnetic flux device 22 includes detector 20. In further alternative embodiments, magnetic flux device 22 may be a permanent magnet coupled directly to sensor head 14.

In alternative embodiments where detector 20 is a coil, the coil may have two functions. The coil may operate simultaneously as an excitation coil, such as excitation coil 16, and a detection coil, such as detector 20. In such alternative embodiments, the coil may be driven simultaneously by both an AC and a DC source. In addition, the AC source may simultaneously transmit signals to the coil at two or more different frequencies.

In the exemplary embodiment, magnetic flux device 22 induces conditioning magnetic flux 23 in ferromagnetic material 12. The conditioning magnetic flux 23 and second magnetic flux 17 generated by magnetic flux device 22 and excitation coil 16, respectively, may be either parallel or perpendicular to each other. In the exemplary embodiment, where magnetic flux device 22 is a coil located proximate sensor head 14 and ferromagnetic material 12, the conditioning magnetic flux 23 is parallel to the generated second magnetic flux 17. Alternatively, where magnetic flux device 22 is a permanent magnet, the conditioning magnetic flux 23 may be perpendicular to the second magnetic flux 17.

In some alternative embodiments, additional sensors, for example proximity, magnetic field, or temperature, may be positioned proximate ferromagnetic material 12. Proximity sensors may be used to monitor gap 13 defined between ferromagnetic material 12 and sensor head 14. Additional magnetometers may be used to monitor background magnetic fields, such as, without limitation, the earth's magnetic field and extraneous electromagnetic interference (EMI). In addition, temperature sensors may be used to monitor temperature changes. Gap changes, temperature changes, and background EMI may affect the signal received by detector 20. By monitoring gap 13, temperature changes, and background EMI, the magnitude of the assorted effects may be substantially reduced by processor 24.

In operation, detector 20 measures a change in magnetic field strength in ferromagnetic material 12 proximate the sensor head 14. The measurements of detector 20 are transmitted to processor 24 and then to a programmable logic unit 34 (not shown in FIG. 1) located away from ferromagnetic material 12. Programmable logic unit 34 is configured to process signals received from sensor head 14 to obtain a measurement of the stress in ferromagnetic material 12.

Figure 2:
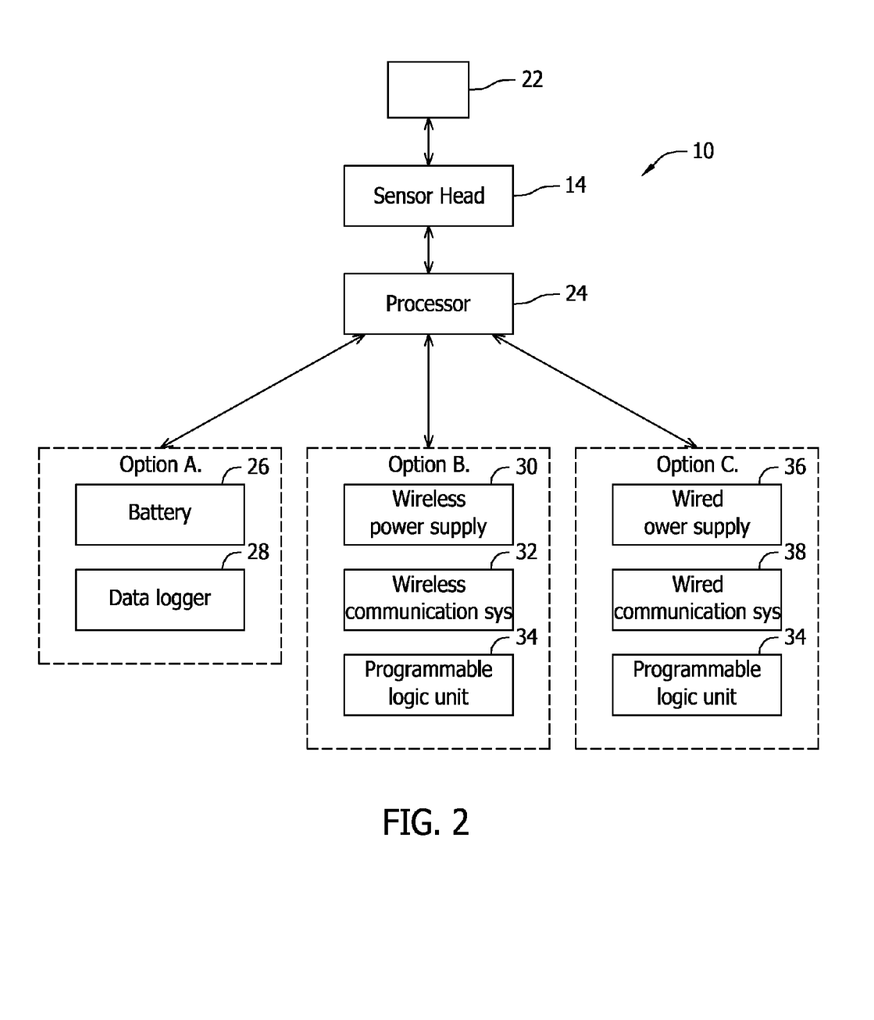
FIG. 2 is a schematic view of the stress sensing system shown in FIG. 1 showing options for transmitting power to a sensor head and, optionally, a magnetic flux device.

FIG. 2 is a schematic view of stress sensing system 10 showing options for transmitting power to sensor head 14 and, optionally, magnetic flux device 22. Such options include Option A, Option B, and Option C, each further described below. As shown in Option A, stress sensing system 10 includes a battery 26. Battery 26 transmits power to sensor head 14 and, if required, to magnetic flux device 22 through processor 24. In an alternative embodiment, Option A also includes a data logger 28. Data logger 28 collects data from sensor head 14 through processor 24. Such data may be retrieved and analyzed to provide non-real time information on the stresses being applied to ferromagnetic material 12. The data also may be used to provide real-time input for controls, as in Option B, and therefore may not be logged. Alternatively, the data may be both logged by data logger 28 and used to provide real-time input for controls.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As shown in Option B, stress sensing system 10 includes a wireless power supply device 30, a wireless communication system 32, and programmable logic unit 34. Wireless power supply device 30 is any power source that enables operation of stress sensing system 10 as described herein, including, without limitation, an inductive power supply. In the exemplary embodiment, wireless power supply device 30, wireless communication system 32, and programmable logic unit 34 are located apart from sensor head 14. Alternatively, wireless power supply device 30, wireless communication system 32, and programmable logic unit 34 may be positioned in any location that enables stress sensing system 10 to operate as described herein.

As shown in Option C, the power to sensor head 14 and, optionally, magnetic flux device 22, and data transfer from sensor head 14 occurs through processor 24. A wired power supply device 36 transmits power to sensor head 14. Additionally, a wired communication system 38 transfers the data between sensor head 14 and processor 24. Alternatively, data transferred from sensor head 14 to wired communication system 38 may be stored in a storage medium (not shown) of programmable logic unit 34.

In alternative embodiments, Options B and C of stress sensing system 10 may include a battery, such as, without limitation, battery 26 (shown with Option A). Battery 26 may be used to transmit power to stress sensing system 10 during a power failure. In such alternative embodiments, during normal operation, battery 26 may be in a stand-by mode.

Figure 3:
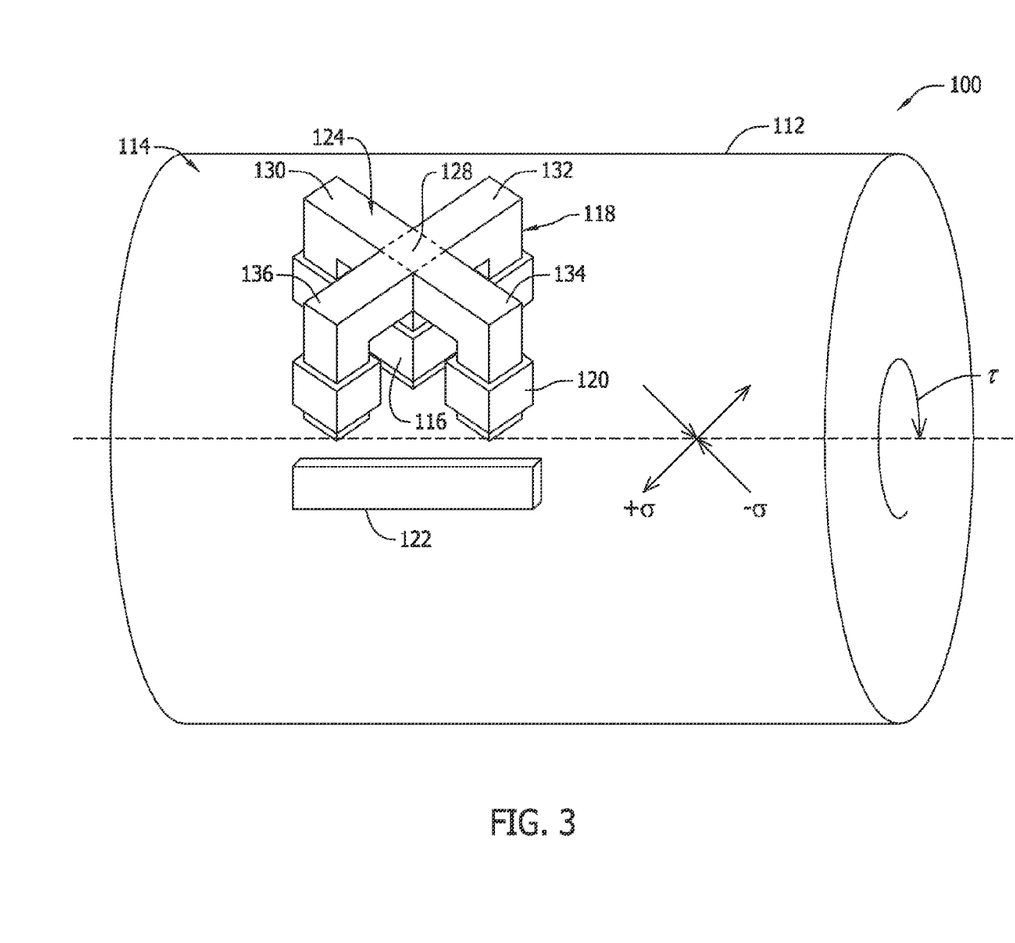
FIG. 3 is a schematic view of an alternative embodiment of the stress sensing system shown in FIG. 1 that is configured for measuring both steady state and transient torque in a ferromagnetic rotatable shaft.

FIG. 3 is a schematic view of an alternative embodiment of stress sensing system 10 that is configured for measuring both steady state and transient torque in a ferromagnetic rotatable shaft 112. A torque sensing system 100 includes a magnetic flux device 122 for inducing conditioning magnetic flux 23 in rotatable shaft 112. In the exemplary embodiment, rotatable shaft 112 is a shaft fabricated from a ferromagnetic material. Magnetic flux device 122 is a permanent magnet that is adjacent to, but does not contact, rotatable shaft 112. Alternatively, magnetic flux device 122 may include any magnetic field inducing device that enables torque sensing system 100 to operate as described herein. For example, without limitation, magnetic flux device 122 may be a coil located proximate a sensor head 114 and rotatable shaft 112.

In the exemplary embodiment, sensor head 114 includes a core 118. Core 118 may be fabricated from any magnetic material, e.g., without limitation, iron. Core 118 includes a cross axis yoke 124. In addition, in the exemplary embodiment, core 118 includes four members 130, 132, 134, 136 that extend planarly outward from a yoke portion 128. The four members 130, 132, 134, 136 are substantially orthogonal to each other around yoke portion 128. Furthermore, each of the four members 130, 132, 134, 136 terminates in an end distal from yoke portion 128. In alternative embodiments, yoke 124 can have any number of members and any configuration that permits yoke 124 to operate as described herein. Furthermore, each member may extend from yoke portion 128 in any configuration and for any length that permits each member to operate as described herein.

Figure 4:
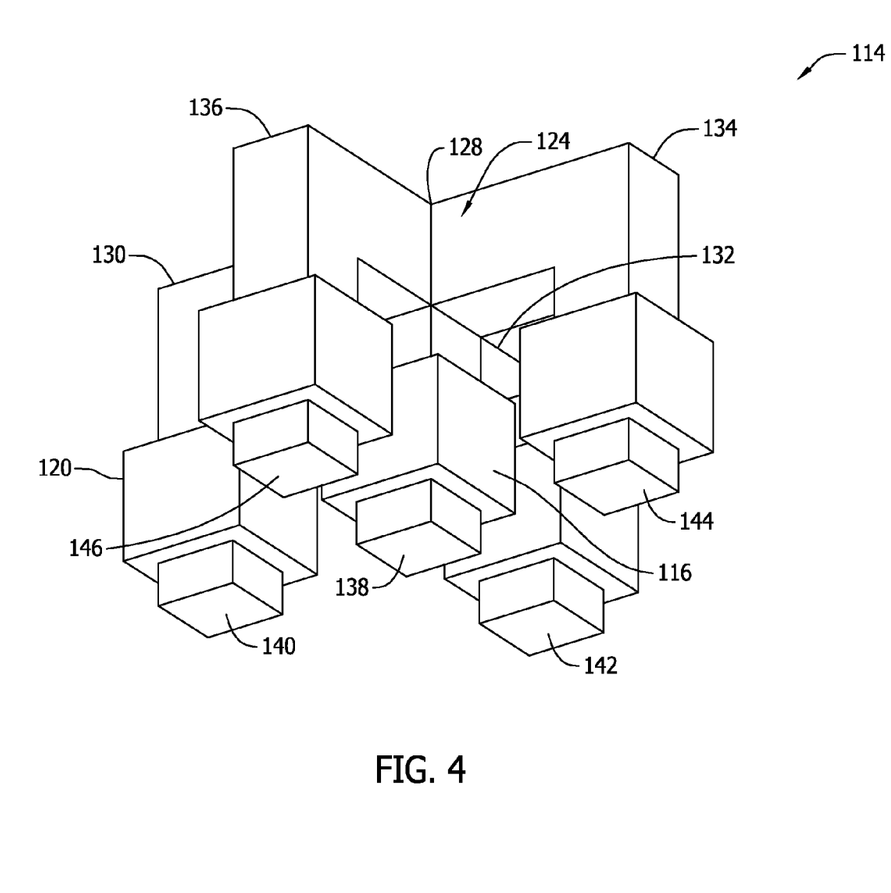
FIG. 4 is a perspective view of a sensor head that may be used with the stress sensing system shown in FIG. 3.

FIG. 4 is a perspective view of sensor head 114. In the exemplary embodiment, an excitation pole element 138 extends outward from yoke portion 128 perpendicular to a planar surface defined by yoke 124. In addition, four member pole elements 140, 142, 144, 146 extend outward from yoke 124 substantially perpendicular to the planar surface defined by yoke 124 and substantially parallel to excitation pole element 138. In the exemplary embodiment, member pole element 140 extends from the distal end of member 130, member pole element 142 extends from the distal end of member 132, member pole element 144 extends from the distal end of member 134, and member pole element 146 extends from the distal end of member 136. In alternative embodiments, core 118 may have any number of pole elements extending from yoke 124 in any configuration that allows core 118 to operate as described herein.

In the exemplary embodiment, sensor head 114 includes an excitation coil 116 wound around excitation pole element 138. In addition, a detection coil 120 is wound respectively around member pole elements 140, 142, 144, 146. More particularly, one detection coil 120 is would around member pole element 140, one detection coil 120 is would around member pole element 142, one detection coil 120 is would around member pole element 144, and one detection coil 120 is wound around member pole element 146. In the exemplary embodiment, during operation, an AC signal is passed through excitation coil 116 to induce second magnetic flux 17 in rotatable shaft 112. Second magnetic flux 17 flows from the excitation pole element 138 of the core 118, through rotatable shaft 112, and returns back to member pole elements 140, 142, 144, 146 of the core 118 where detection coils 120 sense the amount of returning second magnetic flux 17.

Alternatively, torque sensing system 100 may be fabricated as a packaged device with sensor head 114 and magnetic flux device 122 being formed unitarily. In one such embodiment, magnetic flux device 122 may be a permanent magnet coupled directly to sensor head 114. Alternatively, magnetic flux device 122 may include at least one of excitation coil 116 and detection coil 120.

The conditioning magnetic flux 23 and second magnetic flux 17 generated by magnetic flux device 122 and excitation coil 116, respectively, may be either parallel or perpendicular to each other. In the exemplary embodiment, where magnetic flux device 122 is a permanent magnet, the conditioning magnetic flux 23 is perpendicular to the second magnetic flux 17. Alternatively, where magnetic flux device 122 may be one of excitation coil 116 and detection coil 120, the conditioning magnetic flux 23 may be parallel to the second magnetic flux 17.

In the exemplary embodiment, a torque τ is applied to rotatable shaft 112. Torque τ applies stress along a direction offset ±45° from the axis of rotation of rotatable shaft 112. This stress includes both a compressive stress −σ and a tensile stress +σ. The magnetic permeability of rotatable shaft 112 is different in the direction of compressive stress compared with the direction of tensile stress. Detection coil 120 is configured to sense the difference in magnetic permeability. In the exemplary embodiment, torque τ is a force applied to rotatable shaft 112. Other external forces, however, may be applied to rotatable shaft 112 and sensed by torque sensing system 100.

As used herein, the term "magnetic permeability" refers to the relative increase or decrease in the magnetic flux inside a material compared with the magnetic field in which the material is located.

Figure 5:
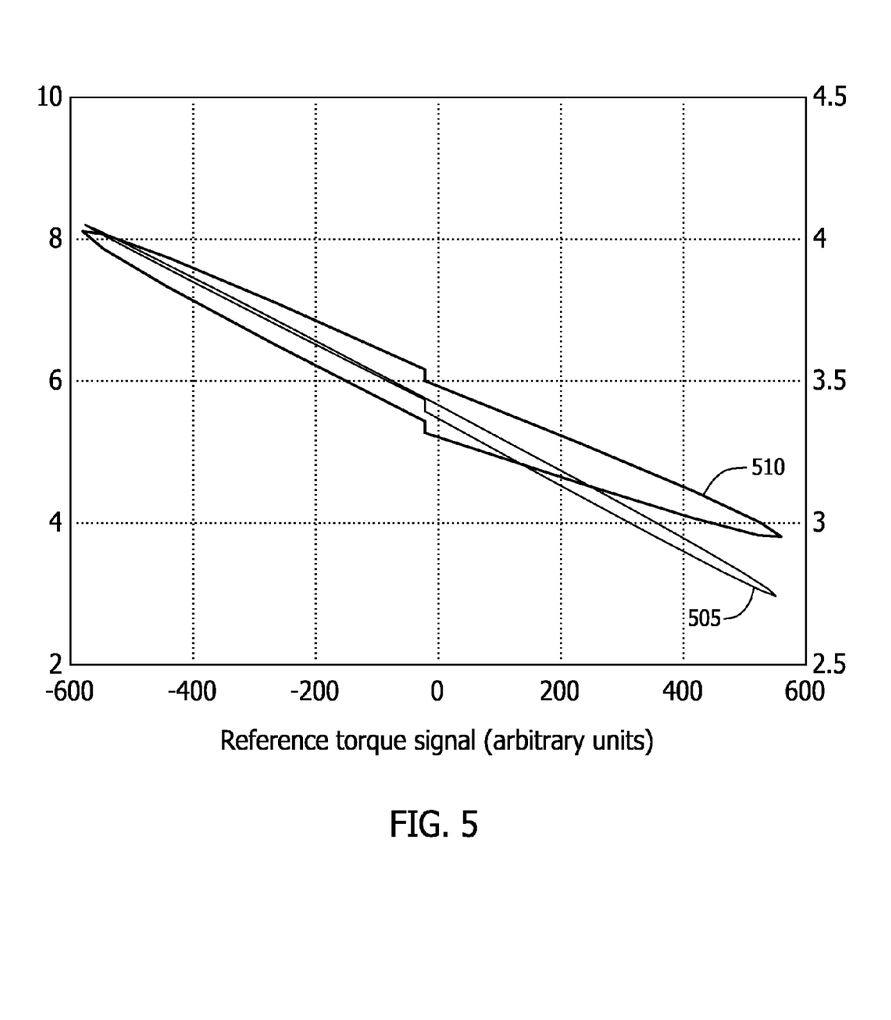
FIG. 5 is a graph that shows the effect in signal linearity and hysteresis of a conditioning magnetic flux applied to a rotatable shaft by the torque sensing system shown in FIG. 3.

FIG. 5 is a graph that shows the effect in signal linearity and hysteresis of conditioning magnetic flux 23 applied to rotatable shaft 112 by torque sensing system 100. Curve 505 is the torque signal received from sensor head 114 with conditioning magnetic flux 23 induced in rotatable shaft 112. Curve 510 represents the torque signal without conditioning magnetic flux 23 induced in rotatable shaft 112. In the exemplary embodiment, curve 505 exhibits more linearity than curve 510 exhibits. In addition, the hysteresis loop of curve 505 is narrower than the hysteresis loop of curve 510, indicating an improvement in the hysteresis associated with torque sensing system 100.

Figure 6:
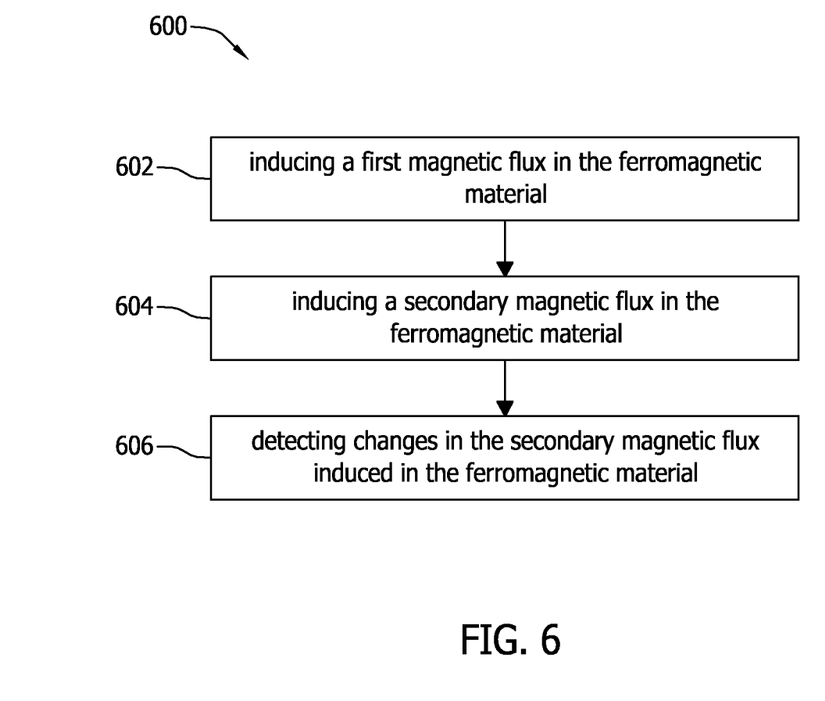
FIG. 6 is a flow chart of an exemplary method for measuring stress in a ferromagnetic material using the stress sensing system shown in FIG. 1.

FIG. 6 is a flow chart of an exemplary method 600 for measuring stress in a ferromagnetic material using exemplary stress sensing system 10. In the exemplary embodiment, a first, i.e., conditioning magnetic flux 23 is induced 602 in ferromagnetic material 12. In the exemplary embodiment, an auxiliary coil driven by either a DC or an AC signal is used to induce conditioning magnetic flux 23. Alternatively, conditioning magnetic flux 23 may be induced with a permanent magnet. Further, second magnetic flux 17 is induced 604 in ferromagnetic material 12. In the exemplary embodiment, second magnetic flux 17 is induced with excitation coil 16, which is part of sensor head 14. Sensor head 14 is positioned proximate ferromagnetic material 12 with a gap 13 defined between excitation coil 16 and sensor head 14. In addition, changes in second magnetic flux 17 induced in ferromagnetic material 12 are detected 606 by detector 20. In the exemplary embodiment, detector 20 is a coil wrapped around at least a portion of core 18 of sensor head 14. Alternatively, detector 20 may be one of several types of magnetic field sensors including, without limitation, magnetoresistive, flux gate, coil, Hall Effect, and magnetoinductive sensors. Detector 20 is configured to transmit a signal indicative of the changes in second magnetic flux 17, wherein the changes in second magnetic flux 17 are a result of stress in ferromagnetic material 12.

In contrast to known magnetostrictive sensors, the stress sensing systems as described herein facilitate inducing a conditioning magnetic flux in a ferromagnetic material to increase the signal-to-noise ratio and linearity of the measurement of second magnetic flux, inducing the second magnetic flux, and detecting the changes in the second magnetic flux due in part to stresses applied to the ferromagnetic material. Specifically, the stress sensing systems as described herein facilitate inducing a conditioning magnetic flux in a ferromagnetic material using magnetic field inducing devices such as coils driven by either a DC source or an AC source, and permanent magnets. The second magnetic flux is induced into the ferromagnetic material by an AC coil to facilitate measuring both transient and steady state stress in the ferromagnetic material. Detecting the changes in the second magnetic flux includes using magnetic field sensors (magnetometers) such as magnetoresistive, flux gate, coil, Hall Effect, and magnetoinductive sensors. Therefore, in contrast to known magnetostrictive sensors, the stress sensing systems as described herein facilitate increasing SNR and signal linearity in the stress sensing system in a manner that reduces costs and simplifies installation. Also, in contrast to known magnetostrictive sensors, the stress sensing systems as described herein facilitates measuring both transient and steady-state stresses in the ferromagnetic material.

An exemplary technical effect of the systems and methods described herein includes at least one of (a) inducing a conditioning magnetic flux in a ferromagnetic material; (b) inducing a second magnetic flux in the ferromagnetic material; and (c) detecting changes in the second magnetic flux.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A system for sensing stress in a ferromagnetic material, said system comprising:
   at least one magnetic flux device configured to induce a first magnetic flux in the ferromagnetic material; and
   a sensor positioned proximate to the ferromagnetic material, said sensor comprising:
      a core;
      at least one excitation coil configured to induce a second magnetic flux in the ferromagnetic material, wherein the at least one excitation coil is configured to be driven simultaneously by both a direct current (DC) source and an alternating current (AC) source; and
      at least one detector configured to detect changes in the second magnetic flux.

2. The system in accordance with claim 1, wherein said core comprises:
   a yoke comprising:
      at least one member;
      an excitation pole element extending from the at least one member; and
      a member pole element extending from the at least one member, wherein the member pole element is substantially parallel to the excitation pole element.

3. The system in accordance with claim 2, wherein:
   said at least one excitation coil extends about at least a portion of said excitation pole element; and
   said at least one detector comprises at least one detection coil, wherein each said member pole element has a respective detection coil extending about at least a portion of said member pole element.

4. The system in accordance with claim 3, wherein said at least one magnetic flux device comprises at least one of said excitation coil and said at least one detection coil.

5. The system in accordance with claim 1, wherein said at least one magnetic flux device comprises at least one of a permanent magnet and a coil.

6. The system in accordance with claim 1, wherein said sensor and said at least one magnetic flux device are formed unitarily.

7. A method for measuring stress in a ferromagnetic material, said method comprising:
   inducing a first magnetic flux in the ferromagnetic material;
   inducing a second magnetic flux in the ferromagnetic material, wherein inducing a second magnetic flux in the ferromagnetic material comprises driving a coil simultaneously by both a direct current (DC) source and an alternating current (AC) source; and
   detecting changes in the second magnetic flux induced in the ferromagnetic material, wherein the changes in the second magnetic flux are at least partially correlated to stress in the ferromagnetic material.

8. The method in accordance with claim 7, wherein inducing a first magnetic flux in the ferromagnetic material comprises inducing the first magnetic flux with at least one permanent magnet.

9. The method in accordance with claim 7, wherein inducing a first magnetic flux in the ferromagnetic material comprises inducing the first magnetic flux with at least one coil.

10. The method in accordance with claim 7, wherein inducing a second magnetic flux in the ferromagnetic material comprises providing at least one electrical signal to the excitation coil, wherein the at least one electrical signal includes at least one of a direct current (DC) signal and an alternating current (AC) signal.

11. The method in accordance with claim 7, wherein detecting changes in the second magnetic flux in the ferromagnetic material comprises positioning at least one detector a predetermined distance from the ferromagnetic material.

12. The method in accordance with claim 11, wherein positioning at least one detector a predetermined distance from the ferromagnetic material comprises positioning at least one detector coil a predetermined distance from the ferromagnetic material.

13. The method in accordance with claim 12, wherein inducing a first magnetic flux in the ferromagnetic material comprises providing at least one electrical signal to the at least one detector coil, wherein the at least one electrical signal includes at least one of a direct current (DC) signal and an alternating current (AC) signal.

14. A system for sensing torque in a rotating shaft, said system comprising:
   at least one magnetic flux device configured to induce a first magnetic flux in the rotating shaft; and
   a sensor coupled a predetermined distance from the rotating shaft, said sensor comprising:
      a core;
      at least one excitation coil configured to induce a second magnetic flux in the rotating shaft, wherein the at least one excitation coil is configured to be driven simultaneously by both a direct current (DC) source and an alternating current (AC) source; and
      at least one detector configured to detect changes in the second magnetic flux induced in the rotating shaft; and
   a processor configured to determine an amount of torque in the rotating shaft based on the detected changes in the second magnetic flux.

15. The system in accordance with claim 14, further comprising at least one of a proximity sensor, a magnetic field sensor, and a temperature sensor.

16. The system in accordance with claim 14, wherein said sensor is configured to measure an amount of torque in the rotating shaft without contacting the rotating shaft.

17. The system in accordance with claim 14, wherein said at least one magnetic flux device comprises at least one of a permanent magnet and a coil.

* * * * *